United States Patent
Lee et al.

(10) Patent No.: US 8,331,876 B2
(45) Date of Patent: Dec. 11, 2012

(54) METHOD AND SYSTEM FOR INITIATING POC SESSION INCLUDING DIFFERENT ANSWER MODES ACCORDING TO MEDIA TYPES

(75) Inventors: Ji-Hye Lee, Seoul (KR); Sang-Kyung Sung, Seoul (KR); Wuk Kim, Gwacheon-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1076 days.

(21) Appl. No.: 11/811,644

(22) Filed: Jun. 11, 2007

(65) Prior Publication Data

US 2007/0298768 A1    Dec. 27, 2007

(30) Foreign Application Priority Data

Jun. 9, 2006  (KR) .................. 10-2006-0052227
Jun. 8, 2007  (KR) .................. 10-2007-0055783

(51) Int. Cl.
*H04B 7/00* (2006.01)

(52) U.S. Cl. .... 455/90.2; 455/518; 455/413; 455/414.1; 455/414.2; 455/543

(58) Field of Classification Search ............... 455/90.2, 455/518, 413, 414.1, 414.2, 543; 709/213, 709/219, 227, 204, 205, 206, 217, 222; 370/218–221
See application file for complete search history.

(56) References Cited

U.S. PATENT DOCUMENTS

| | | | |
|---|---|---|---|
| 7,415,284 B2* | 8/2008 | Hoover et al. | 455/518 |
| 7,499,719 B2* | 3/2009 | Rengaraju et al. | 455/518 |
| 8,036,608 B2* | 10/2011 | Holm | 455/90.2 |
| 2003/0008657 A1* | 1/2003 | Rosen et al. | 455/452 |
| 2005/0137962 A1* | 6/2005 | Penney et al. | 705/37 |
| 2005/0254510 A1* | 11/2005 | Oja et al. | 370/431 |

FOREIGN PATENT DOCUMENTS

| | | |
|---|---|---|
| KR | 1020060006664 | 1/2006 |
| KR | 1020060056515 | 5/2006 |
| WO | WO 2006/054857 | 5/2006 |

* cited by examiner

*Primary Examiner* — Wayne Cai
*Assistant Examiner* — Julio Perez
(74) *Attorney, Agent, or Firm* — The Farrell Law Firm, P.C.

(57) ABSTRACT

Disclosed is a method and system for initiating a Push-To-Talk over Cellular (PoC) session between PoC clients supporting various types of media. A PoC client performing Open Mobile Alliance-type multimedia communication service supports a plurality of media types and makes it possible to independently and more conveniently initiate a session irrespective of answer modes set according to media types when the answer modes according to the media types are not equal to each other.

10 Claims, 9 Drawing Sheets

| | |
|---|---|
| Request-URI | sip:PoC-ClientA@networkA.net |
| SIP HEADERS | |
| P-Preferred-Identity: | "PoC User A" <sip:PoC-UserA@networkA.net> |
| Accept-Contact: | *;+g.poc.talkburst; require;explicit |
| User-Agent: | PoC-client/OMA1.0 Acme-Talk5000/v1.01 |
| Contact: | <sip:PoC-ClientA@networkA.net>; |
| Event: | poc-settings |
| Content-Type: | application/poc-settings+xml |

XML MIME BODY

```
<?xml version="1.0" encoding="UTF-8"?>

<poc-settings xmlns="urn:oma:params:xml:ns:poc:poc-settings"
         xmlns:xsi="http://www.w3.org/2001/XMLSchema-instance"
         xsi:schemaLocation="urn:oma:params:xml:ns:poc:poc-settings">
<entity id="do39s8zksn2d98x">
    <isb-settings>
      <incoming-session-barring active="false">
    </isb-settings>
    <am-settings>
      <answer-mode>voice=automatic</answer-mode>
    </am-settings>
    <ipab-settings>
      <incoming-personal-alert-barring active="false"/>
    </ipab-settings>
  <sss-settings>
   <simultaneous-sessions-support active="true"/>
   </sss-settings>
  </entity>
    </poc-settings>
```

FIG.8

METHOD AND SYSTEM FOR INITIATING POC SESSION INCLUDING DIFFERENT ANSWER MODES ACCORDING TO MEDIA TYPES

PRIORITY

This application claims priority under 35 U.S.C. §119(a) to an application entitled "Method And System For Initiating PoC Session Including Different Answer Modes According To Media Types" filed in the Korean Industrial Property Office on Jun. 9, 2006 and assigned Serial No. 2006-52227, and Jun. 8, 2007 and assigned Serial No. 2007-55783, the contents of which are incorporated herein by reference.

BACKGROUND OF THE INVENTION

1. Field of the Invention

The present invention relates generally to a method and system for initiating a Push to Talk (PTT) over Cellular (PoC) session between PoC clients supporting various types of media, and more particularly to a method and system for enabling a session to be independently and simply initiated between a Controlling PoC server (CF) and a transmitting party PoC client regardless of answer modes set according to the media types, when a session participating PoC client sets different answer modes depending on the media types on a receiving party Participating PoC server (PF) in a multimedia PoC environment.

2. Description of the Related Art

Significant development of mobile communication technologies and expansion of communication networks have enabled wide-ranging services and applications using mobile phones. Diversification of user requests causes the services to be expanded to a positioning, a multimedia and a Push to Talk (PTT) service without being limited to a simple communication service. Particularly, the PTT service supports not only a group and a voice communication which have been available in a conventional radio transmitter and a Trunked Radio System (TRS), but also various additional functions such as an instant messenger and a status display.

Currently, extensive research is being performed so as to standardize a PoC service which employs such a PTT concept in a mobile communication network. One of the features of the PoC service that distinguishes it from the conventional mobile communication service, is that a user can make a call while moving between sessions if necessary, because he/she belongs to a plurality of sessions. The requirement that a user be able to communicate while moving among a plurality of sessions, that is, the requirement for a multi-session function is specified in the Open Mobile Alliance (OMA), which is a body defining the mobile communication services.

The PoC V2.0 system supports a PoC multimedia communication service and defines new types of multimedia such as video, image and text. Further, current PoC systems can display multi-streams such as a video or image due to the improved performance of terminals.

Then, the flow of signals when an auto-answer mode has been set between a receiving party PoC client and a PoC server during a PoC session initiation procedure in the PoC system including the PoC client supporting various types of media, as mentioned above, will be described with reference to FIG. 4.

As illustrated in FIG. 4, receiving party PoC client B sets a answer mode for receiving media on PoC server B through PoC service setting at step 400. The answer mode includes an auto-answer mode and a manual-answer mode. Since only voice has been supported by PoC V1, the user was able to set the auto-answer mode for voice. Here, if the PoC client B sets the auto-answer mode for voice at step 400, the PoC server B transmits an acknowledgement message at step 402, thereby completing an answer mode setting for media to be received by the PoC client B.

When PoC client A, which desires to establish a PoC session, transmits a session participation request message (i.e., an INVITE message) to PoC server A including a PF and a CF at step 404, the CF forwards the session participation request message to the PoC client B, which has been invited, through the PoC server B at steps 406 and 412. Before forwarding the session participation request message to the PoC client B, the PoC server B identifies that the answer mode of the PoC client B has been set to an auto-answer mode through the PoC service setting established in steps 400 and 402, and transmits an automatic response message to the session participation request message to the CF at step 408. After receiving the automatic response message, the CF transmits an unconfirmed OK response to the PoC client A at step 410 so as to initiate a PoC session in advance before receiving the final OK response of the PoC client B. When an automatic response PoC session is initiated through the procedure, the CF gives a Talk Burst Granted floor to the PoC client A at step 414, and the PoC client A starts media transmission at step 416.

After buffering media received from the PoC client A, the CF transmits the buffered media to the PoC client B through steps 424 and 426 when receiving the final OK response of the PoC client B to the session participation request message (i.e., INVITE message) at step 420 and step 422.

As described above, when a session is initiated based on the conventional PoC V1, types of transmittable media are limited to voice or PoC speech, so that it is possible to establish the corresponding PoC session through the answer mode setting. However, according to PoC 2.0, various types of video, images and texts can be transmitted in addition to voice. Therefore, upon establishing a PoC session supporting various PoC multimedia services, as described above, if the answer modes according to media types are not equal to each other, the PoC server cannot decide what answer mode the PoC server will follow in performing the response, thereby causing an error.

That is, since the PoC V2.0 system does not support answer modes for various types of media, there may be a limitation in session establishment when the answer modes according to various media types supported by the PoC V2.0 are not equal to each other.

SUMMARY OF THE INVENTION

Accordingly, the present invention has been made to solve the above-mentioned problems occurring in the prior art, and the present invention provides a method and system for enabling initiation of a session independent of answer modes set according to media types when mutually different answer modes depending on various media types supported by a PoC client are set.

The present invention provides a method and system for allowing a CF to integrate, and provide floors irrespective of OK responses according to media types received, in response to a PoC session invitation message, from a receiving party PoC client.

The present invention provides a method and system for resetting an answer mode according to media types by a receiving party participating PoC server when a plurality of media types provided by a transmitting party PoC client are bound in one message format.

In accordance with an aspect of the present invention, there is provided a PoC system including a receiving party PoC server and a receiving party PoC client which set an answer mode for at least one media type as an auto-answer mode between the receiving party PoC server and the receiving party PoC client, the PoC session initiation system having mutually different answer modes depending on media types, the PoC session initiation system including the receiving party PoC server for checking answer modes according to media types when a session participation request message for at least one type of media is received from a transmitting party PoC server, transmitting an auto-answer message for media set as an auto-answer mode to the transmitting party PoC server, and transferring the session participation request message to the receiving party PoC client, the receiving party PoC client for transmitting a response message including information about whether the receiving party PoC client participates in a session, which is input by a user, when the session participation request message is received, and the transmitting party PoC server for storing information on answer modes according to the media types when the auto-answer message is received, establishing a PoC session and granting a floor to the transmitting party PoC client, buffering media transmitted from the transmitting party PoC client, and transferring the buffered media to the receiving party PoC client when the response message is received.

In accordance with an aspect of the present invention, there is provided a method for initiating a PoC session comprising mutually different answer modes according to media types in a PoC system, which includes a receiving party PoC server and a receiving party PoC client which set answer modes for at least one media type as an auto-answer mode between the receiving party PoC server and the receiving party PoC client, the method including checking, by the receiving party PoC server, answer modes according to media types when the receiving party PoC server receives a session participation request message for at least one media type from a transmitting party PoC server, transmitting, by the receiving party PoC server, an auto-answer message for media set as an auto-answer mode to the transmitting party PoC server after the receiving party PoC server checks answer modes according to media types, and transferring the session participation request message to the receiving party PoC client, transmitting, by the receiving party PoC client, a response message including information about whether the receiving party PoC client is to participate in a session, which is input by a user, when the receiving party PoC client receives the session participation request message, storing, by the transmitting party PoC server, information on the answer modes according to the media types when the transmitting party PoC server receives the auto-answer message, and establishing a PoC session and granting a floor to the transmitting party PoC client, and buffering, by the transmitting party PoC server, the received media when the transmitting party PoC server receives the media from the transmitting party client, and transferring the buffered media to the receiving party PoC client when the transmitting party PoC server receives the response message from the receiving party PoC client.

BRIEF DESCRIPTION OF THE DRAWINGS

The above and other aspects, features and advantages of the present invention will be more apparent from the following detailed description taken in conjunction with the accompanying drawings, in which:

FIG. 8 illustrates a format of a Session Initiation Protocol (SIP) PUBLISH message of a PoC service setting for setting an answer mode according to the present invention.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness.

Figure 1:
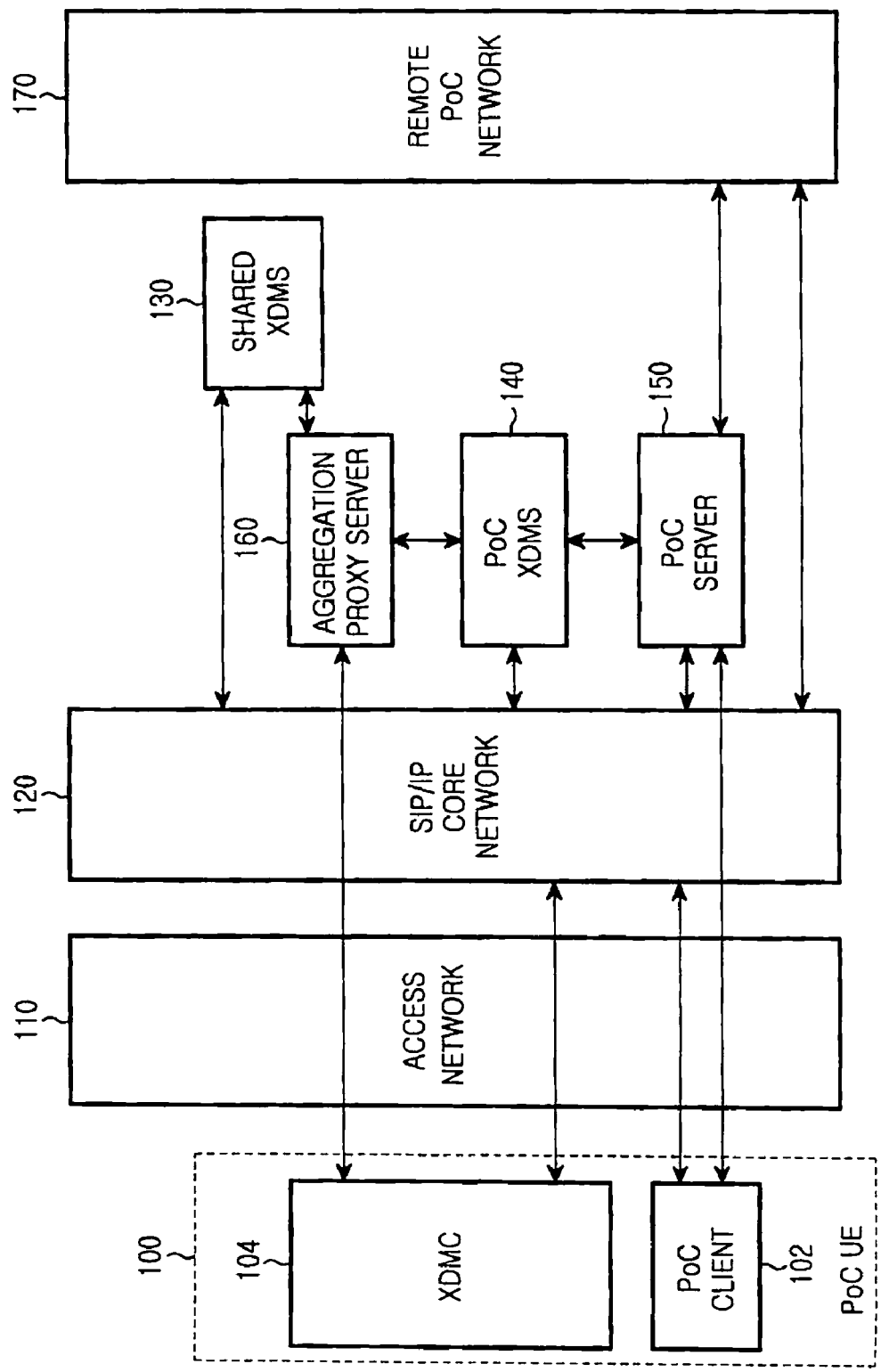
FIG. 1 illustrates the construction of a conventional PoC service system.

The following description will regard an example in which the present invention is applied to a PTT system, particularly to a PTT over Cellular (PoC) system which provides a PTT service through a cellular mobile communication network. Generally, a PoC system uses an SIP and an SIP extension protocol in order to transfer session participation information for group communication, and uses an XML Configuration Access Protocol (XCAP) in order to acquire group information. The following embodiment of the present invention may be implemented with the aforementioned protocols, and the basic construction of the present invention may be based on the PoC Rel. 1 system. FIG. 1 illustrates the construction of a conventional PoC service system and a related network.

As illustrated in FIG. 1, the conventional PoC system may include a PoC User Equipment (UE) 100, XML Document Management Servers (XDMSs) 130 and 140, and a PoC server 150. In addition, the PoC system may further include an aggregation proxy server 160. The components above may be connected to each other through an access network 110, a SIP/IP core network 120 and a remote PoC network 170.

The PoC UE 100 may include a PoC client 102 and an XML Document Management Client (XDMC) 104.

The PoC client 102, which represents a service requester contained in the PoC UE 100, resides in the PoC UE 100 and performs a network access so as to provide a PoC service subscriber with a PoC service. The PoC service subscriber may be provided with a PoC service through the PoC UE equipped with the PoC client. In the following description, the "PoC client" will be used as the general term for the PoC service subscriber and the UE equipped with a PoC client. Also, the reference numeral of the PoC client will be omitted unless a specific distinction is required.

The PoC client is mainly used to enable a PoC service subscriber (i.e. PoC user) to establish a PoC session, participate in or terminate an established session. The PoC client also has functions for creating and transmitting a talk burst, supporting an instant personal alert, and authenticating an access to a PoC service. The PoC client is connected via the access network 110 to the SIP/IP core network 120, which importantly supports SIP/IP multimedia services.

The SIP/IP core network 120 is connected to the PoC server 150 and the XDMSs 130 and 140 so as to support the PoC service. In this case, the PoC server 150 can perform a controlling PoC function for maintaining and managing a PoC session, and perform a participating PoC function for participating in a PoC session established for point-to-point communication or multipoint communication.

Meanwhile, a PoC service is accompanied with a group session establishment service, such as conference communication. To this end, the OMA standard defines the XDMSs 130 and 140 and the XDM client 104 for a group list service. FIG. 1 shows a PoC XDMS 140 used for a PoC service and a shared XDMS 130 compatible with other service enablers. Information on a group and a group member may be input into the XDMSs 130 and 140 through the PoC client. The PoC client obtains information on other PoC clients it can call, through a list of individuals or groups received from the XDMSs 130 and 140. Meanwhile, creation, modification and management of groups and group members in the XDMSs 130 and 140 may be conducted via a communication network such as the Internet or Intranet. Description and protocols for managing XML documents (e.g., creation, modification and removal of group lists) will be omitted for the sake of conciseness.

Furthermore, for a group service, upon receiving a group list-related request from the XDM client 104, the aggregation proxy server 160 routes the request to the XDMSs 130 and 140 according to appropriate rules.

The PoC server 150 will now be described.

Figure 2:
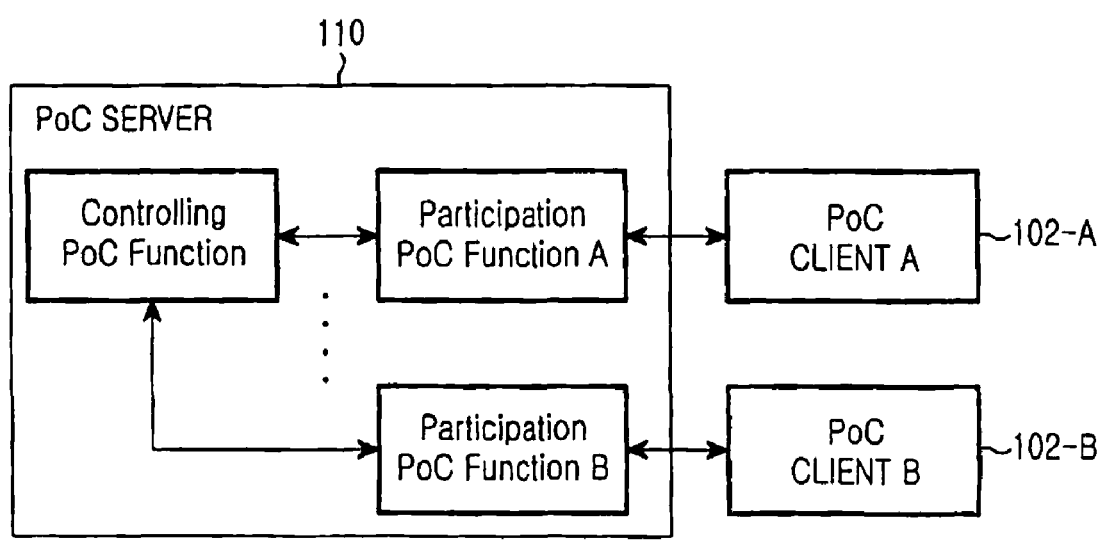
FIG. 2 is a block diagram illustrating the construction of a conventional PoC server.

FIG. 2 illustrates the construction of a conventional PoC

The functions of the PoC server may be classified into a Controlling PoC Function (CF) for generally maintaining and managing PoC sessions and a Participating PoC Function (PF) for handling maintenance and management for each PoC session. The characteristics according to each function of the PoC server will now be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation The CF performs the overall management of PoC sessions among the functions of the PoC server, as shown in Table 1. Particularly, the CF receives PoC clients' requests for the floor and determines an order of the requests and gives the clients the floor in that order. Also, the CF distributes a talk burst from a specific PoC client to the other PoC clients participating in a group PoC call, and provides information about the PoC clients participating in the group PoC call.

As shown in Table 2 below, the PF manages sessions connected to the CF and each PoC client during a PoC session. Particularly, when the PoC client requests for the floor or the floor is given to the PoC client by the CF, the PF relays the floor. The PF performs a media relay function between the CF and the PoC client, and a transcoding function when the CF and the PoC client use different codecs. In simultaneous sessions, when a talk burst is generated in a session while another talk burst is occurring in simultaneous sessions, the PF performs a filtering function for one of them according to the choice of the PoC user.

TABLE 2

Participating PoC Function (PF)

Figure 3:
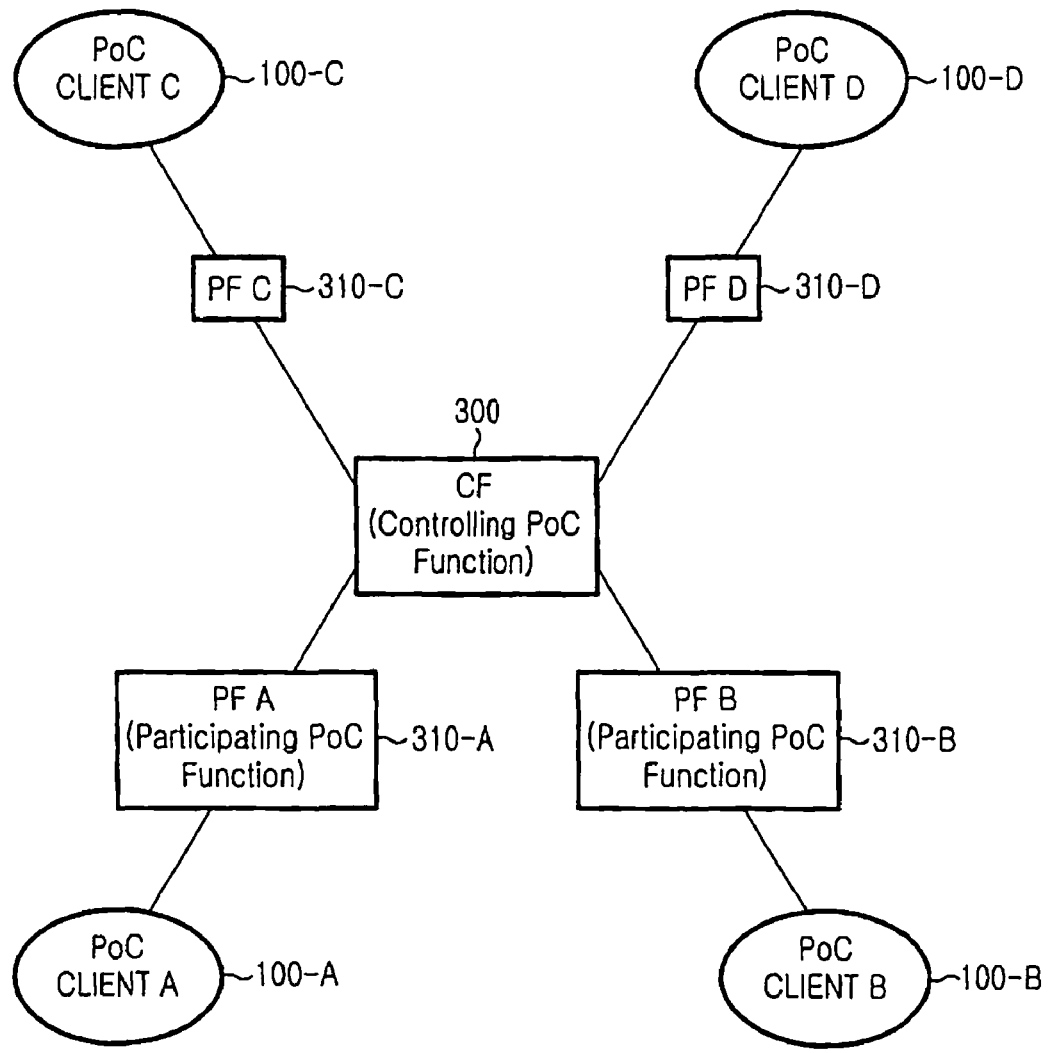
FIG. 3 is a block diagram illustrating the construction of a controlling PoC function (CF) unit and a participating PoC function (PF) unit of a PoC server.
Figure 4:
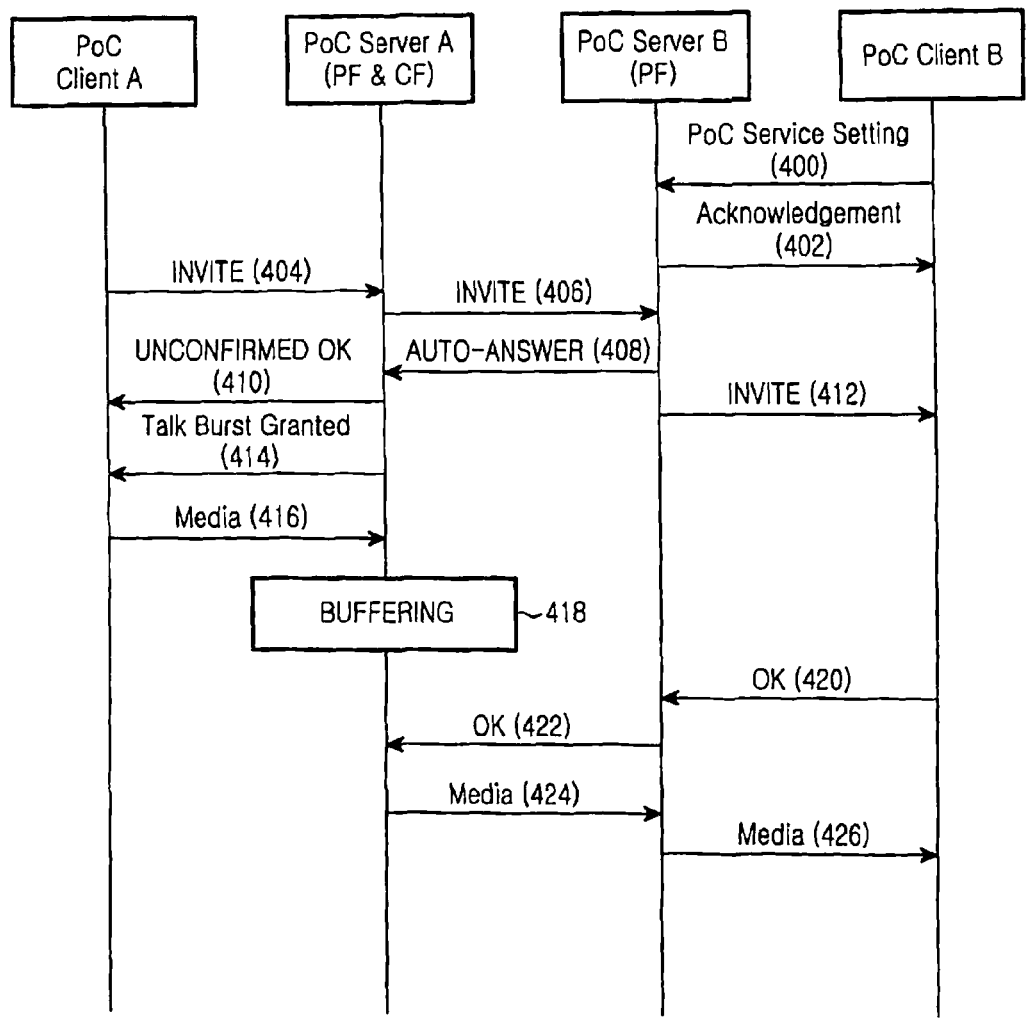
FIG. 4 illustrates a procedure of an auto-answer mode PoC session initiation generally provided by PoC V1.

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 illustrates the CF block and PF block of a PoC server.

PoC clients 100-A to 100-D are connected to a CF 300 through PFs 310-A to 310-D and establish PoC sessions. Thereafter, media for a corresponding talk burst of a PoC client, which has been granted the floor from the CF 300, are sent to the other PoC clients. In this case, the PoC client which has the floor cannot output a talk burst until having checked information on PoC clients participating in the group session.

Meanwhile, call processing technology for communication connection in a PoC system may have various procedures depending on requirements and situations of transmitting and receiving parties. Characteristics of a PoC system required by the OMA according to the setup of the transmitting and receiving parties are as follows:

First, the receiving party can establish its own answer mode according to the requests of the PoC client, where the answer mode may be classified into an auto-answer mode and a manual-answer mode. In the auto-answer mode, when the transmitting party is included in a PoC client list preset by the receiving party, a response is directly sent to the transmitting party by a corresponding network, instead of the receiving party's manual-answer. This is done since the PoC server has a function to store information on the answer mode and the corresponding user list in accordance with a answer mode setup request of the UE. Meanwhile, the manual-answer mode is performed when the transmitting party is not included in the automatic response user list, when it is unclear whether the transmitting party is included in the automatic response user list, or when the receiving party establishes a manual-answer mode to every user. In the manual-answer mode, a PoC communication request is transmitted to the UE through the reception network and the call is connected after the PoC client's permission.

Second, the PoC system may have an on-demand session mode and a pre-established session mode according to whether it is to be connected with a PoC server within the home network of the PoC user. The pre-established mode refers to a technology where a PoC client establishes a session in advance between the PoC client and the PoC server which belongs to its own home network according to its own requests. Such a pre-established session is necessary to negotiate media parameters to be used by a PoC client with the PoC server in advance so that a session can be rapidly established without renegotiation for the media parameters to be used between the PoC server and the client in the future.

In order to establish a pre-session, a PoC client employs an SIP INVITE method so as to provide media parameters supported by a Session Description Protocol Multipurpose Internet Mail Extensions (SDP MIME) body, media parameters provided by the server, and a response to the media parameters provided by the server. When the PoC client receives a response message from the server, the response message is sent together with identification information of a newly pre-established session, including a conference Uniform Resource Identifier (URI), to the PoC client.

When such a pre-established session is used, it is possible to negotiate in advance an IP address, a port number, a codec to be used, a media type and a talk burst control protocol. The on-demand session mode corresponds to a status where a PoC client establishes no pre-session and another PoC client establishes no pre-session. Thus, the PoC client performs a procedure for connecting a PoC call after receiving an invitation message from another PoC client.

A setup of an answer mode for the communication request in the PoC system can be stored in both a PoC server, i.e., a network element and the PoC client, i.e., a UE.

When an answer mode is established in a home network managing a PoC client, the answer mode is realized in the PoC server having the PF within the home network to which the PoC client belongs.

When the answer mode has been established in the network, the PF immediately and automatically responds to another PoC server's request for PoC communication by transmitting a session progress message to the network which has requested communication. Therefore, when the auto-answer mode has been established, the call request procedure is simplified, as compared to when a response is transmitted after the session setup message is transferred to the PoC client, thereby reducing the initial time period required for granting the floor.

However, when the response is automatically performed in the network, a result other than a user's response can occur. Therefore, an answer mode can be set up even in the PoC client. In this case, the answer mode of the PoC client has a higher priority than the answer mode set up on the network. This is performed for the purpose of avoiding a privacy problem caused by the answer mode which is not updated in real time due to signal delay or error in the network when a PoC client modifies its answer mode and requests the PoC server to update the answer mode.

In summary, although the user's answer mode for the PoC service can be set up in both the PoC server and PoC client, a answer mode is determined by the PoC client in which the latest user's intention has been reflected, and a stream of media (e.g., actual user's voice and images) is transferred based on the determination.

A procedure for establishing a PoC multimedia session in the aforementioned PoC system will now be described.

A transmitting party PoC client requests a call processing by transmitting a multimedia invitation message (the multimedia including audio, video and various texts) by means of an SIP protocol. In response to such a call processing request, a receiving party client performs various response procedures depending on an answer mode set up in the corresponding PoC server and on whether a pre-established session has been established. The call processing procedure for PoC communication will now be described by using examples of procedures of networks for both the transmitting and receiving parties.

A transmitting party PoC client sends an SIP INVITE request including SIP address information of a receiving party PoC client, with whom the transmitting party PoC client desires to communicate, to a corresponding SIP/IP core network. In this case, the SIP INVITE message may further include elements such as PoC address information of the transmitting party PoC client, required media parameters and characteristic value information identifying a PoC service. Herein, the "required media parameters" may include a plurality of characteristic values, such as an encoding method regarding audio and video, a rate, and a payload type, when the required session is related to multimedia.

The SIP INVITE message is transferred to a participating PoC server via corresponding IMS servers (i.e., a Proxy-Call Server Control Function (P-CSCF) and a Serving-Call Server Control Function (S-CSCF)) in the IMS network, based on a path query in a Dynamic Host Configuration Protocol (DHCP) server or a Domain Name Server (DNS). When a normal communication is requested, a participating PoC server, to which a PoC client is connected, can be realized separately from a controlling PoC server managing a talk burst of an established session, so that the SIP INVITE request sent to the PF server is transferred to the CF server via the SIP/IP core network of a corresponding network.

Meanwhile, a PoC session controlling network including a CF transfers an SIP INVITE request message to the receiving party network, and then receives a response message from the receiving party network. The SIP message sent from the receiving party network may be a 1xx provisional response message, a 2xx successful response message, or one of 4XX to 6XX error response messages, depending on a setup of the PF and the receiving party PoC client. In the auto-answer mode, an SIP 183 Session Progress signal may be received as a response message, through which a connection between the PoC server and the client can take place in an IMS network of a communication requester. As a communication permission signal of the reception party PoC client, an SIP 183 Session Progress or SIP 200 OK response is transmitted to the PoC client via CF and PF PoC servers. Upon receiving the 200 OK response or 183 Session Progress signal from the receiving party PoC server, the CF confirms that the PoC call has been connected, and transmits a Floor Granted signal to the transmitting party PoC client so as to grant the floor for a talk burst. The response, i.e., granting the floor for a talk burst according to the SIP 200 OK or 183 Session Progress signal, may be identified by using a "Confirmed" or "Unconfirmed" response message. According to an embodiment of the present invention, when the CF receives the "Unconfirmed" response, it requires a buffering function.

Meanwhile, after receiving a response signal for the SIP INVITE request signal, the transmitting party PoC client receives a Floor Granted signal transferring a talk burst transmission permission signal (e.g., a ring back tone) through a Real Time Control Protocol (RTCP). The Floor Granted signal is created by the CF having a talk burst mediation right, and transmitted to the PoC client through the PF managing the corresponding PoC client. Since the Floor Granted signal uses a bearer path instead of the SIP protocol, the Floor Granted signal can be transmitted without passing through an SIP/IP core network such as the IMS. The PoC client who confirmed the ring back tone transfers a stream of media (e.g., voice) using a Real-Time Transport Protocol (RTP).

The following description will be given with respect to a method and system for enabling a session establishment independent of a corresponding answer mode when a PoC client performing OMA PoC multimedia communication service in a PoC system constructed as above has set different answer modes depending on media types. Here, the media types refer to various multimedia types in a PoC system, such as voice or PoC speech, video, images, texts, audio, files, etc., and each media type or a combination of media types can be connected with a media-floor control entity.

Hereinafter, so as to allow those skilled in the art to easily perform the present invention, exemplary embodiments of the present invention for executing a session establishment independent of a corresponding answer mode when a receiving party PoC client has set different answer modes depending on media types in the PoC system will now be described in detail.

Figure 5:
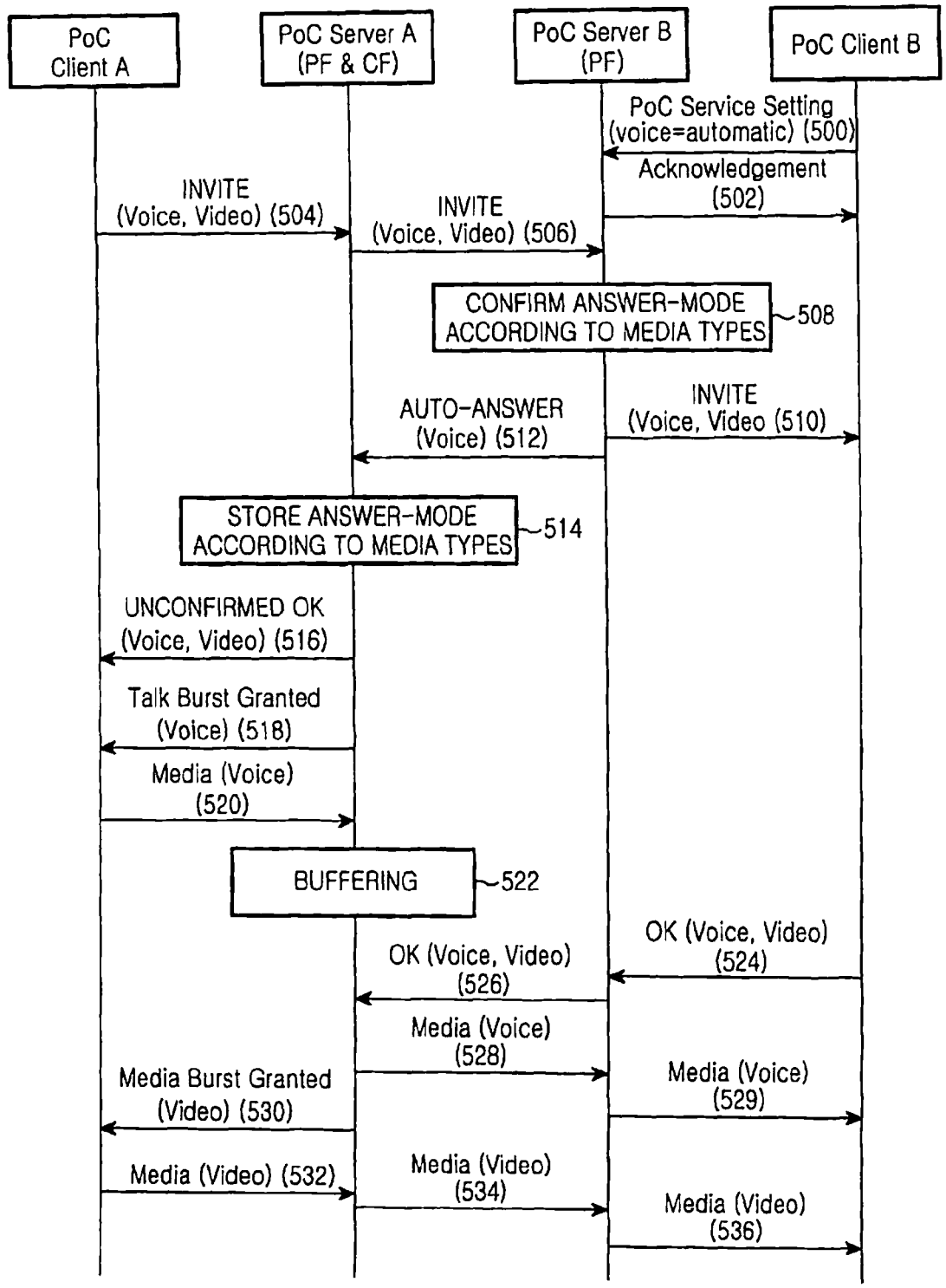
FIG. 5 illustrates the flow of signals between a PoC client and a PoC server for effectively establishing a session with a PoC client supporting different answer modes by media types according to the present invention.

FIG. 5 illustrates the flow of signals transmitted/received between PoC clients and PoC servers according to an effective session initiation with a PoC client supporting different answer modes depending on the media types, and according to granting of the floor separated by media types, in the PoC system in which multimedia can be transmitted during a PoC session according to the present invention.

As illustrated in FIG. 5, PoC client B sets its answer mode to an auto-answer mode for only a voice media type on PoC server B at step 500, and receives an acknowledgement to the setting at step 502. In this case, it is assumed that the answer modes of real time media types other than voice, such as video and audio, cannot be set, or basically are set to a manual-answer mode, so that answer modes according to reception media types are not equal to each other. Since only the voice has been set to the auto-answer mode, it shows that the environment may be the same as a conventional environment of using an auto-answer mode setting in the PoC V1.0 in which voice is a unique media type.

At step 504, PoC client A transmits a session participation request message to a CF so as to establish a PoC session for transmitting voice and video. Although video among various multimedia types is described as an example at step 504, other types of multimedia may be transmitted together with voice.

Thereafter, the CF transmits the session participation request message to PoC client B, having been invited, through the PoC server B at step 506. At step 508, the PoC server B confirms an answer mode set in the PoC service settings, which have been set through steps 500 and 502, and transmits the auto-answer message only for the voice media type to the CF at step 512 according to the confirmed answer mode. Additionally, at step 510, the PoC server B transfers the session participation request message for establishing the PoC session for transmitting voice and video to PoC client B.

In the meantime, when receiving the auto-answer message, the CF stores media type information of the auto-answer mode according to the auto-answer message at step 514. Also, independently of receiving the auto-answer for the voice at step 512, the CF transfers an unconfirmed OK message to PoC client A in order to establish in advance a session capable of transmitting both voice and video requested by PoC client A, before receiving the final OK response from PoC client B in step 516. Therefore, although a PoC session capable of transmitting both voice and video has been established between PoC client A and the CF at step 516, the CF grants PoC client A the floor by which only media having an On type response for a corresponding session establishment request message can be transmitted. That is, the CF transmits a talk burst granted message for allowing only voice media to be transmitted at step 518.

Accordingly, PoC client A transmits in advance only the voice type media to the CF at step 520, and the CF buffers the received voice type media at step 522.

Thereafter, the CF waits for a final OK response to the session establishment request message from PoC client B. When receiving the final OK message for receiving voice and video from PoC client B at steps 524 and 526, the CF transfers the voice type media, which has been received from the PoC client A and buffered, to PoC client B at steps 528 and 529. In addition, since having received even the final OK response for the video type, the PoC server A gives PoC client A a media burst granted floor capable of transmitting other media types in addition to voice at step 530. Accordingly, PoC client A transmits video type media to the CF at step 532, and the CF transfers the received media to PoC client B through the PoC server B at step 534 and 536 without buffering the received media because the CF has already received the final OK response from PoC client B invited to the corresponding session.

According to the present invention described with reference to FIG. 5, the CF first grants the floor to the transmitting party PoC client with respect to only the media for which the receiving party PoC client has set its answer mode as an auto-answer mode, and then grants the floor for other media besides voice to the transmitting party PoC client when receiving the final OK message for other media from the receiving party PoC client. That is, it is possible to grant the floors separated by the media types.

Alternatively, the CF may grant the transmitting party PoC client an integrated floor capable of transmitting all types of media even when receiving an auto-answer message for voice media, which will now be described with reference to FIG. 6.

Figure 6:
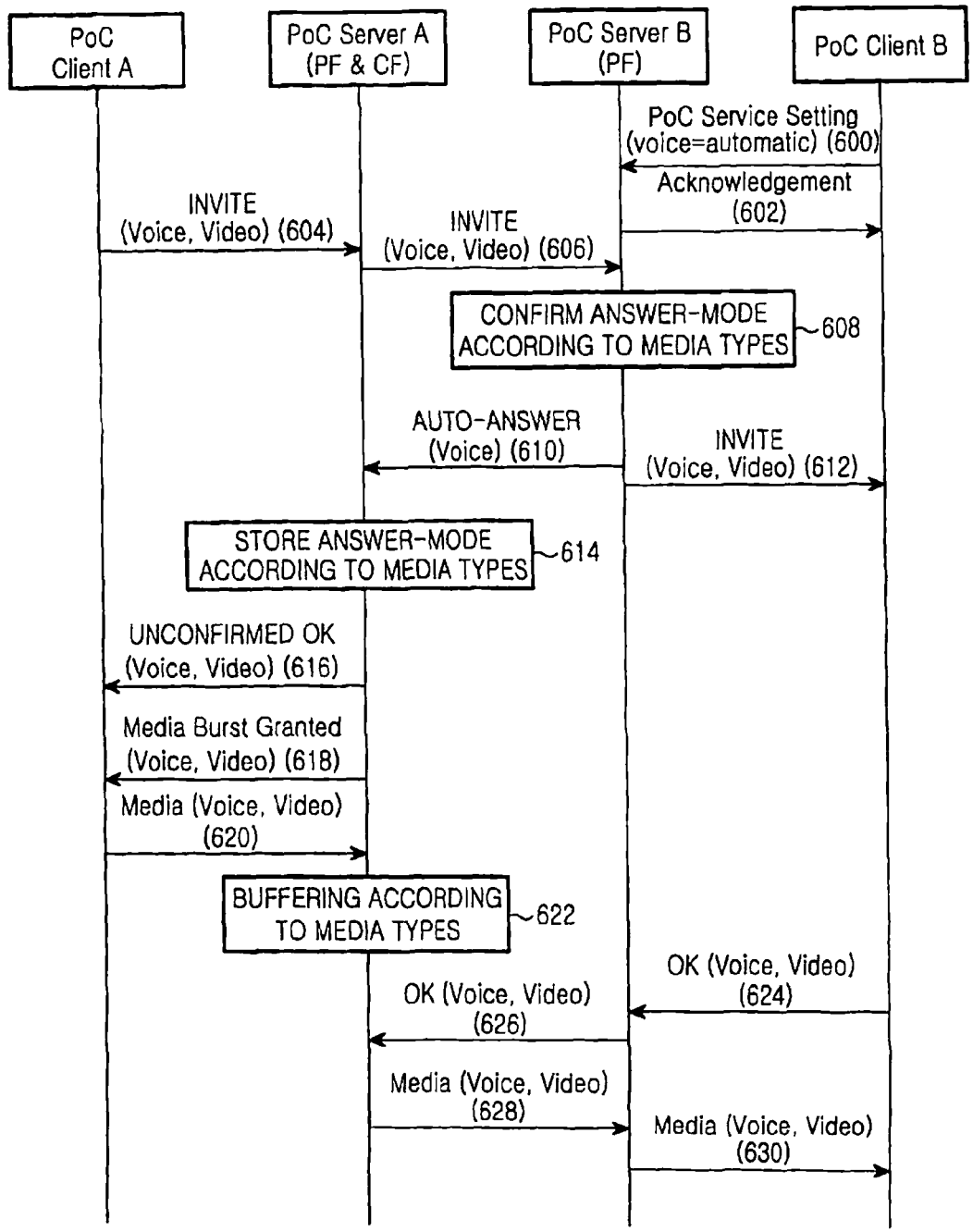
FIG. 6 illustrates the signal flow of a PoC client and a PoC server for integrating and providing a floor by the PoC server irrespective of an answer mode according to media types of the PoC client according to the present invention.

FIG. 6 illustrates the flow of signals transmitted/received between PoC clients and PoC servers when the integrated floor is granted to the overall media types desired to be transmitted by the PoC client A. The flow of signals at steps 600, 602, 604, 606, 608, 610, 612 and 614 in FIG. 6 is the same as those at steps 500, 502, 504, 506, 508, 510, 512 and 514 in FIG. 5, so a detailed description thereof will be omitted.

The CF stores media type information of the auto-answer mode at step 614 according to the auto-answer message received at step 610 from the PoC server B. Thereafter, the CF transfers, to the PoC client A, an unconfirmed OK message to previously establish a session allowing both voice and video requested by the PoC client A to be transmitted in step 616. Independently of receiving the auto-answer for the voice at step 610, a PoC session allowing both voice and video to be transmitted between the PoC client A and the CF is established before the final OK response from the PoC client B is received in step 616. Also, as the PoC session is established as described above, the CF grants the PoC client A a media burst granted floor capable of transmitting both voice and video requested by the PoC client A in step 618.

The PoC client A, which has been granted the floor enabling the PoC client A to transmit both voice and video, transmits the voice and video type media to the CF at step 620. Then, the CF separates and buffers the received media according to the types of media at step 622. That is, the CF separates voice and video types of media and stores the separated media in respective buffers.

When receiving the final OK response to the INVITE (i.e., session establishment request) message from the PoC client B at steps 624 and 626, the CF transfers the voice and video type media, which has been received from the PoC client A and buffered, to the PoC client B at steps 628 and 630. When the final OK response from the PoC client B includes all of the media types requested by the PoC client A, the CF transfers all of the media separately buffered according to the media types to the PoC client B. However, when the final OK response from the PoC client B includes only a part of media types requested by the PoC client A, the CF can transfer only media of media types included in the final OK response of the PoC client B among the media separately buffered by media types.

Meanwhile, since the procedures of FIGS. 5 and 6 where the receiving party PoC server B transmits the INVITE message to the receiving party PoC client B corresponds to procedures of inquiring about a session establishment for real time media types other than voice, a manual-answer of the end user may be requested. Therefore, according to another embodiment of the present invention, a multimedia session may be established according to the determination of the user by requesting a compulsory manual-answer to the INVITE message shown in the figures. To this end, the receiving party PoC server B checks one or more media types included in the INVITE message, and transmits an INVITE message including manual-answer request instructor information when receiving real time media unspecified in a answer mode. In addition, the PoC client B, having received the INVITE message including the manual-answer request instructor information, manually responds regardless of a preset answer mode.

Figure 7:
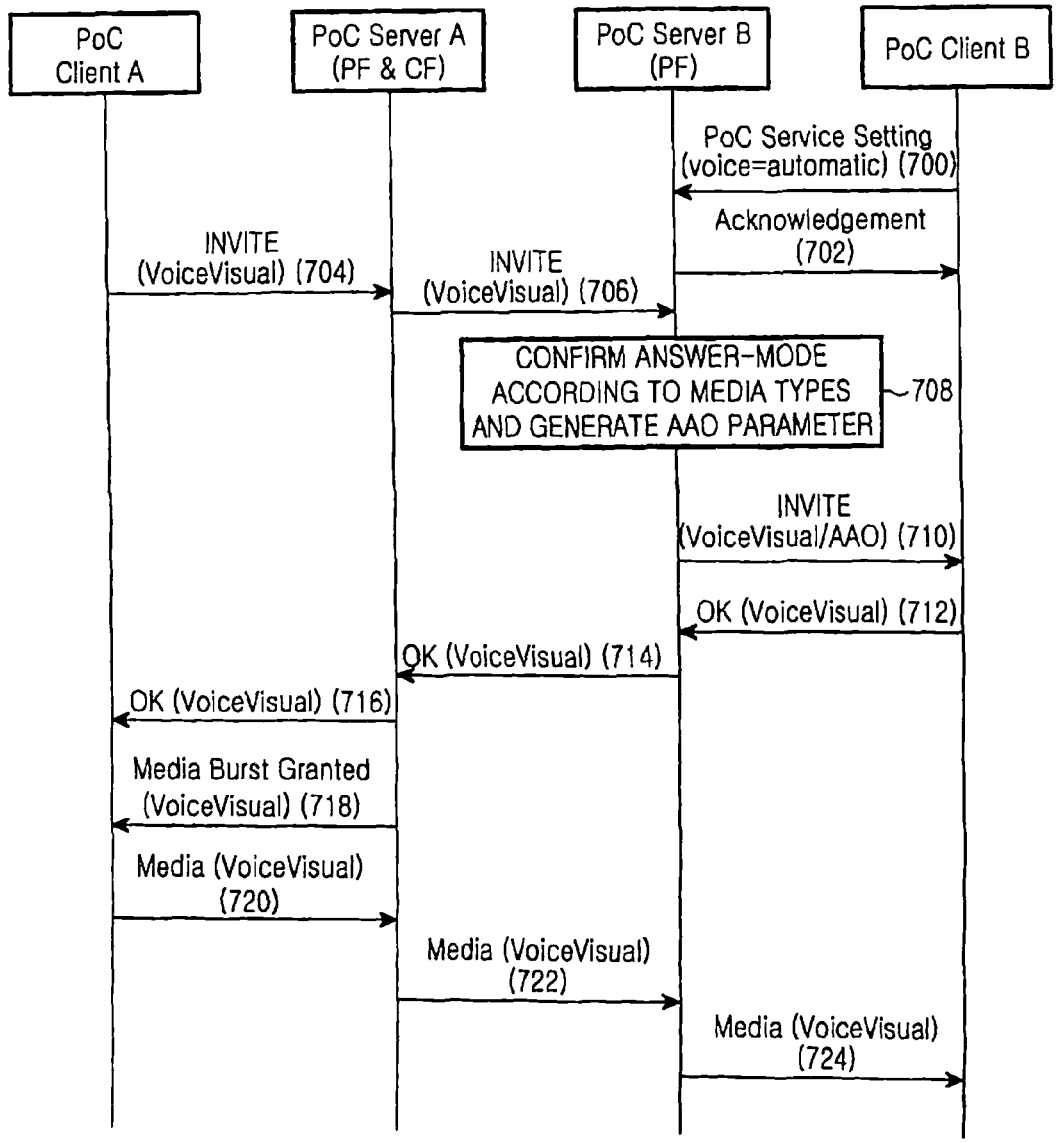
FIG. 7 shows the flow of signals between a PoC client and a PoC server for establishing a session according to the present invention when a plurality of media types provided by the PoC client are bound in one message format.

FIG. 7 illustrates the flow of signals between PoC clients and PoC servers when multimedia can be transmitted in a PoC session, and media types transmitted from a transmitting party PoC client are bound into one floor management entity in an effective session establishment with a PoC client supporting different answer modes based on media types according to the present invention.

As illustrated in FIG. 7, at steps 700 and 702, PoC client B sets its answer mode for voice as an auto-answer mode on PoC server B, and receives the acknowledgement of the setting. Since answer modes for real time media other than voice, such as video and audio have not been set, an auto-answer mode cannot be supported for the real time media, and a manual-answer mode is provided as a default value therefor. Thus, when PoC client B sets the auto-answer mode only for voice, the answer mode for voice differs from those of different media, so that answer modes according to types of receiving media are not equal to each other.

According to the present invention, when PoC client A intends to transmit binding media, in which voice and video type media are bound, such as a moving picture, different session initiation procedures are performed depending on the PoC server's ability to distinguish the binding media.

FIG. 7 illustrates the flow of signals for a session initiation when the transmitting party PoC client intends to transmit binding media. Referring to FIG. 7, PoC client A transmits a session participation request message for establishing a PoC session to transmit voice/visual type media, in which two-type media of voice and video are bound, to the CF through steps 704, 706 and 710. Then the CF transfers the session participation request message to the invited PoC client B through the PoC server B. In this case, the PoC server B identifies a PoC service setting established by the PoC client B in step 708. Based on the identification of the PoC service setting at step 708, the PoC server B identifies that the auto-answer has been set only for voice media through steps 700 and 702. In this case, according to a rule of the PoC server B, the voice/visual media may be regarded as a new type of media, or may be determined as media in which two media types of voice and video are bound, thereby applying answer modes set corresponding to each of the media types. In this case, the PoC server B can generate an INVITE message including a header field, i.e., an Auto-Answer Override (AAO) at step 708 so as to request the manual-answer of the receiving PoC user, and transmit the INVITE message to PoC client B.

A case where the PoC server B determines the voice/visual as a new type of media at step 708 will now be described. As shown in FIG. 7, the PoC server B determines that a preset answer mode, i.e., an auto-answer mode can not be applied. Therefore, the PoC server B transfers an INVITE message, which includes the AAO field to override the auto-answer mode and to request a manual-answer while informing that the message refers to a session participation request for transmission of the voice/visual type media, to PoC client B at step 710. Through steps 712, 714 and 716, when the final OK response of the PoC client B is transferred to PoC client A through the PoC server B and the CF, a corresponding multimedia PoC session is established. After establishment of the multimedia PoC session, the CF grants PoC client A a media burst granted floor capable of allowing PoC client A to transmit all the media types supported by the final OK message received from PoC client B in step 718. Accordingly, PoC client A transmits media of media types corresponding to the granted floor to the CF at step 720, and the CF transfers the corresponding media to PoC client B through the PoC server B without buffering in steps 722 and 724.

A case where the PoC server B determines the voice/visual as binding media in which two types of media are bound at step 708 will now be described. As described with reference to FIGS. 5 and 6, an auto-answer mode may be applied to the voice type media, and a manual-answer mode may be applied to the video type media. However, when the two media types are bound, since the answer modes according to the media types are different, synchronization may not be achieved in transmitting a stream of the bound media. Accordingly, it is impossible to apply an existing answer mode to a media type bound by a single floor manager, so that a session establishment is performed based on a basic manual-answer procedure. That is, a session participation request message transmitted by PoC client A is transferred to PoC client B. After PoC client B makes a decision, it transfers the final OK response message to PoC client A through the PoC server B and the CF. Thereafter, when the session is established, floor granting and media transmission procedures according to the session establishment are performed in the same manner as the flow of signals described at steps 718 to step 724.

Figure 9:
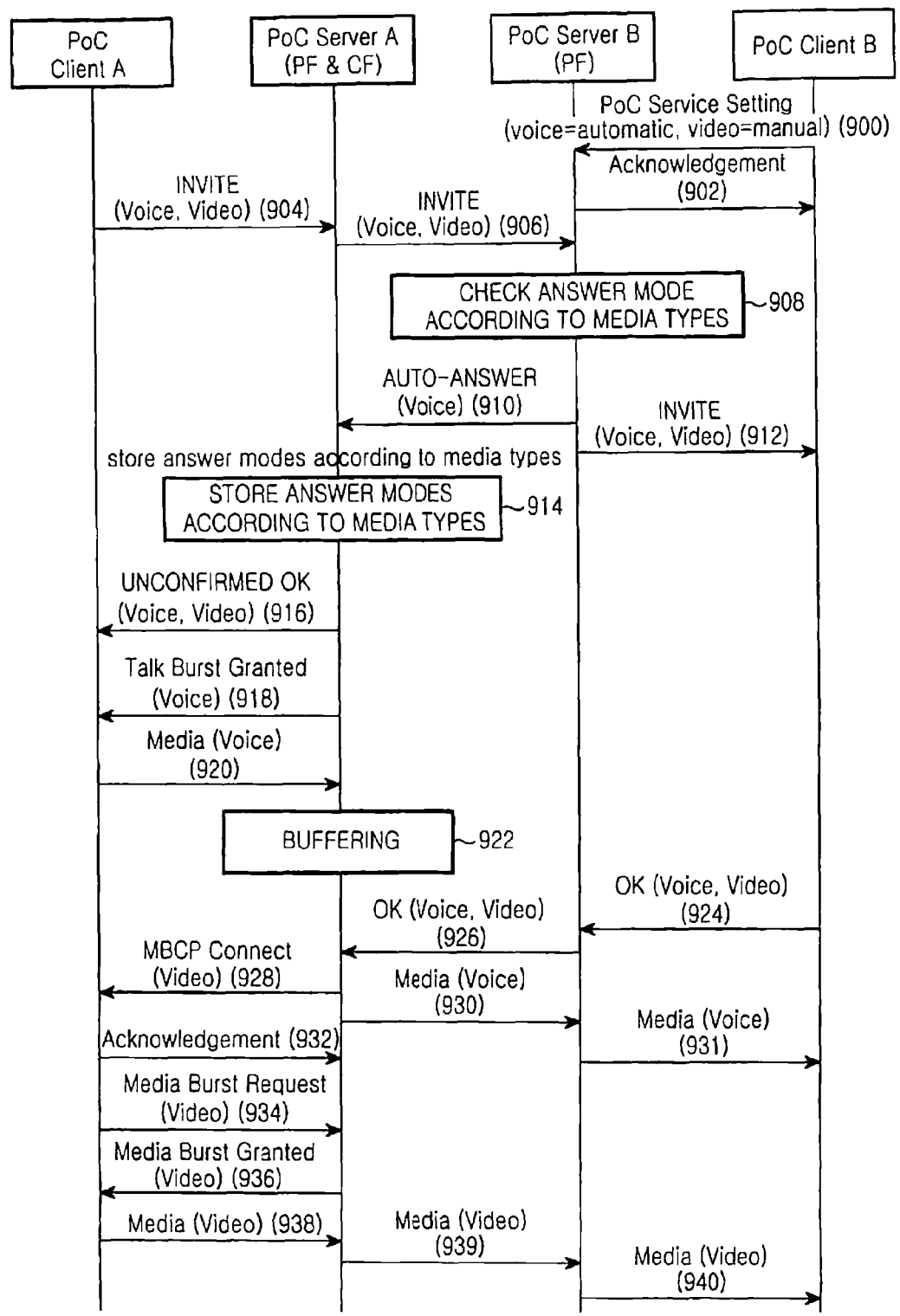
FIG. 9 illustrates the flow of signals between a PoC client and a PoC server for effectively establishing a session with a PoC client that supports different answer modes by media types and separating the floors by media types according to the present invention.

FIG. 8 illustrates information on SIP PUBLISH message contents in the PoC service setting for an answer mode setting according to the present invention. FIG. 9 illustrates the flow of signals transmitted/received between PoC clients and PoC servers according to an effective session initiation with a PoC client supporting different answer modes depending on the media types, and according to granting of the floors separated by media types, in the PoC system capable of transmitting multimedia during a PoC session according to the present invention.

As illustrated in FIG. 9, if PoC client B sets its answer mode to an auto-answer mode for a voice or PoC speech media type on PoC server B, and sets its answer mode to a manual-answer mode for a video media type at step 900, it receives an acknowledgement in response thereto from the PoC server B at step 902. In this case, it is assumed that the answer modes for real time reception media types other than voice, such as video and audio, are not equal to each other.

At step 904, PoC client A transmits a session participation request message to a CF, that is, PoC server A, so as to establish a PoC session for transmitting voice and video. Hereinafter, the PoC server A will be referred to as the CF. Although video among various multimedia types is described as an example at step 904, other types of multimedia may be transmitted together with voice.

Thereafter, the CF transmits the session participation request message to the PoC client B, having been invited, through the PoC server B at step 906. At step 908, the PoC server B confirms answer modes set according to media types in the PoC service settings, which have been set through steps 900 and 902, and transmits the auto-answer message only for the voice media type to the CF at step 910 according to the confirmed answer mode for the voice media type. Additionally, at step 912, the PoC server B transfers the session participation request message for establishing the PoC session for transmitting voice and video to the PoC client B.

In the meantime, upon receiving the auto-answer message, the CF stores information on a media type, for which the answer mode is set to the auto-answer mode, according to the auto-answer message at step 914. Also, independent of receiving the auto-answer for the voice at step 910, the CF transfers an unconfirmed OK message to the PoC client A at step 916 in order to establish in advance a session capable of transmitting both voice and video requested by the PoC client A, before receiving the final OK response from the PoC client B.

Here, independent of the answer modes set at the receiving party, the PoC client A operates as if a session capable of transmitting all media types included in the unconfirmed OK message was established. Although the PoC session capable of transmitting both voice and video has been established between the PoC client A and the CF at step 916, the CF grants the PoC client A the floor having the ability to transmit only a media type for which an acknowledgement to a corresponding session establishment request message has been received. That is, at step 918, the CF transmits a talk burst granted message for allowing only voice media to be transmitted.

Accordingly, the PoC client A transmits in advance only the voice type media to the CF at step 920, and the CF buffers the received voice type media at step 922.

Thereafter, the CF waits for a final OK response to the session establishment request message from the PoC client B. Upon receiving the final OK message for receiving voice and video from the PoC client B at steps 924 and 926, the CF transfers the voice type media, which has been received from the PoC client A and buffered at step 922, to the PoC client B at steps 930 and 931. In addition, since the PoC server A has also received the final OK response for the video type, it transmits an MBCP (Media Burst Control Protocol) Connect message to the PoC client A at step 928, thereby informing the PoC client A that the video type can also be transmitted in a corresponding session.

At step 932, the PoC client A transmits an acknowledgement message for confirming the reception of the MBCP Connect message to the CF. The acknowledgement message step 932 may be transmitted when requested by the MBCP Connect message or in order to inform the CF whether the PoC clients A accepts or rejects the corresponding MBCP Connect message.

If the PoC client A has implicitly requested the floor for the video type media in the session participation request message at step 904, and a negotiation for the floor has been completed at the time of session establishment, a subsequent media burst request for the video type media at step 934 may be omitted, and the CF grants the PoC client A a media burst granted floor enabling the transmission of media types other than voice. In FIG. 9, video is described as an example of the other media types, so the PoC client A transmits video type media to the CF at step 938, and the CF transfers the received media directly to the PoC client B through the PoC server B at step 939 and 940 without buffering the received media because it has already received the final OK response from the PoC client B invited to the corresponding session.

Dissimilar to FIG. 5, according to the present invention described with reference to FIG. 9, a CF can use an MBCP Connect message for informing a transmitting party PoC client that a corresponding media type can be transmitted in a corresponding session, before directly granting a media burst granted for the corresponding media type. Therefore, there is an advantage in that the transmitting party PoC client can have a choice to transmit a media burst request and receive a media burst granted for a corresponding media type according to its dynamic demands.

For the auto-answer setting in the conventional PoC V1, since a transmittable media type in a PoC session is limited to voice, the auto-answer is available for the voice media when the answer mode is set as "automatic". According to a multimedia PoC session disclosed in the present invention, an answer mode may be set to "voice=automatic", so as to satisfy both PoC V1 and backward compatibility, to apply the auto-answer only to voice among various types of media, and to apply the manual-answer to the other types of media. In addition, it is clear that media types other than voice may also be set as the auto-answer according to the preference of the receiving party PoC client. Moreover, it is clarified that an answer mode may be differently set according to respective media types in a PoC v2 multimedia PoC session.

According to the present invention as described above, while the PoC client, which receives an OMA PoC multimedia communication service, can support each answer mode setting according to media types, it is possible to initiate a multimedia PoC session independent of set answer modes when the answer modes set according to media types are not equal, and a session initiation request PoC client can be granted floors separated by media types. A PoC UE participating in a corresponding session can transmit and receive an optimal combination of multimedia streams after a minimum time interval according to media types has elapsed. For example, a PoC speech (or voice) type of media, which can be set as an auto-answer mode, can be transmitted earlier than the other types of media.

Under the aforementioned circumstances, the CF can provide an integrated floor irrespective of media types to be transmitted by the PoC client so that a session initiation request PoC client can simultaneously transmit multimedia streams independently of the answer mode setting of a session participation PoC client. Also, the CF can provide a session establishment method suitable for the answer modes of the receiving party PoC client according to media types by storing the answer modes according to the media types.

Furthermore, when a steam of media to be transmitted by the PoC client includes a plurality of media types which are bound, and the answer modes of the media types have been set to be mutually different, a method for resetting the answer modes to a unified answer mode can be provided through a answer mode setting modification procedure by the receiving party PoC server.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for initiating a multimedia session having mutually different answer modes corresponding to media types in a terminal, the method comprising the steps of:
receiving an input for setting answer modes corresponding to respective media types;
storing setting information of the answer modes corresponding to the respective media types;
transmitting the setting information of the answer modes corresponding to the respective media types to the server; and
transmitting a response message including information about whether the terminal participates in a session, which is input by a user, when a session participation request message is received from the server,
wherein, when an answer mode corresponding to a media type for a session establishment request included in the session participation request message is an auto-answer mode, the terminal transmits an OK message to the server, and
wherein, when the answer mode corresponding to the media type for the session establishment request included in the session participation request message is a manual answer mode, the terminal transmits a response message including information about whether a floor is granted to the server.

2. The method as claimed in claim 1, further comprising:
receiving a stream of media from the server when the response message is an OK message for the media types.

3. The method as claimed in claim 1, wherein the plurality of media types includes voice, video and various text.

4. The method as claimed in claim 1, wherein the session participation request message includes at least one of media types for session establishment.

5. The method as claimed in claim 1, wherein, when the session participation request message for the plurality of media types is received from the server, the terminal transmits an OK message for one among the plurality of media types.

6. A method for initiating a multimedia session having mutually different answer modes corresponding to media types in a server, the method comprising the steps of:
receiving setting information for answer modes corresponding to respective media types from the receiving terminal;
setting answer modes for the respective media types using the received setting information for the answer modes;
receiving a session participation request for at least one media type between the receiving terminal and a transmitting terminal;
determining whether answer modes of the receiving terminal are set;
checking answer modes set corresponding to at least one media type requested from the transmitting terminal when the answer modes of the receiving terminal are set; and
performing the received session participation request according to the checked answer modes,
wherein, when an answer mode corresponding to a media type for a session establishment request included in the session participation request message is an auto-answer mode, the server receives an OK message from the terminal, and
wherein, when the answer mode corresponding to the media type for the session establishment request included in the session participation request message is a manual answer mode, the server receives a response message including information about whether a floor is granted from the terminal.

7. The method as claimed in claim 6, wherein the plurality of media types includes voice, video and various text.

8. The method as claimed in claim 6, wherein the session participation request is for requesting a session participation to at least one of the media types.

9. The method as claimed in claim 6, wherein the performing the received session participation request according to the checked answer modes comprising:
transmitting, when an answer mode set corresponding to the at least one media type included in the session participation request is an auto-answer mode, a response for the at least one media type to transmitting terminal.

10. The method as claimed in claim 6, further comprising:
transmitting, when an answer mode set corresponding to the at least one media type included in the session participation request is an manual answer mode, a session participation request message for at least one media type to the receiving terminal.

* * * * *